A. D. & F. W. SMITH.
Assignors, by direct and mesne assignments, of part to C. W. CRUTSINGER.
AUTOMATIC RELEASE FOR CABLE GRIPS.
No. 11,275. Reissued Oct. 4, 1892.
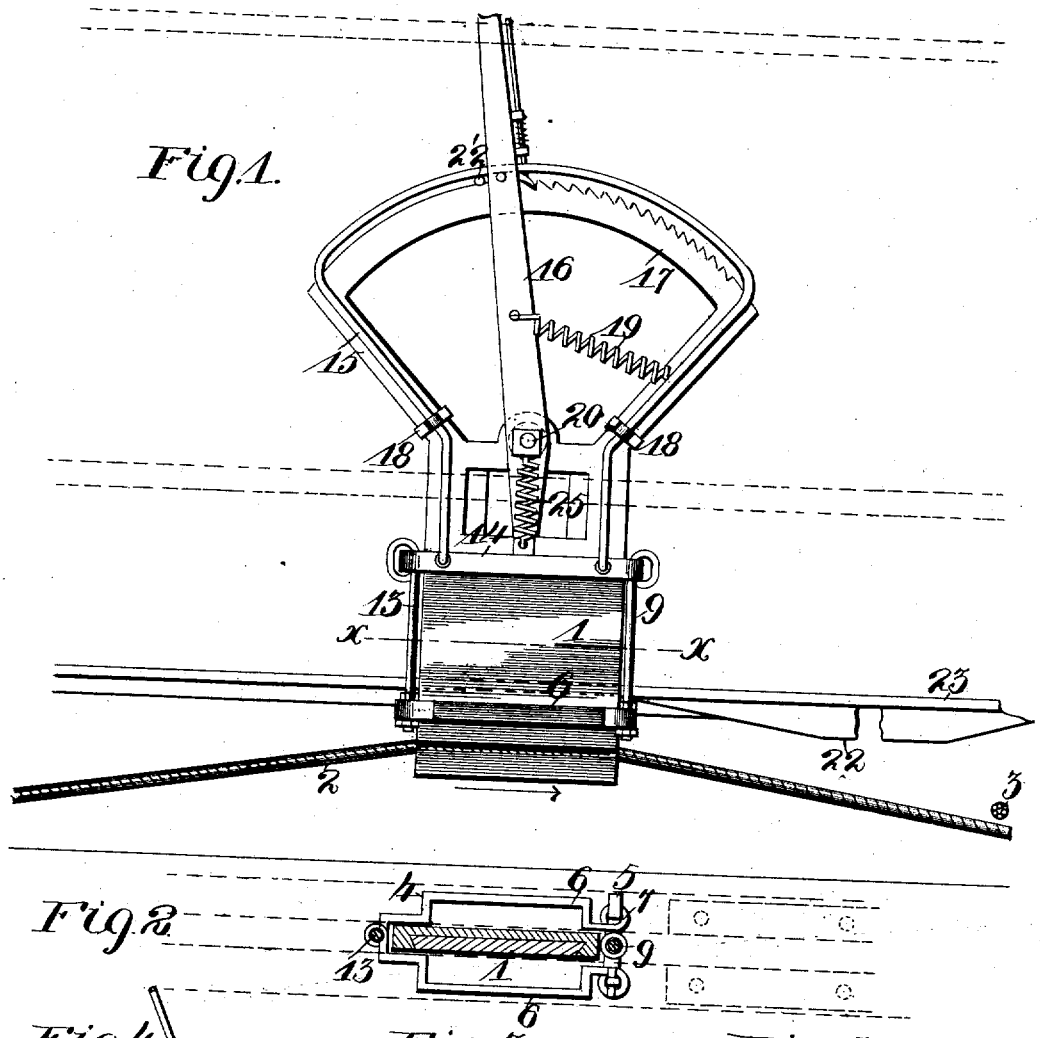
Witnesses
D. Thd. Rudolf
Wm. J. Walker.
Inventors
Albert D. Smith,
Frank W. Smith.
By their Attorneys.
Keller & Stuart
THE NORRIS PETERS CO., PHOTO-LITHO., WASHINGTON, D. C.

UNITED STATES PATENT OFFICE.

ALBERT D. SMITH AND FRANK W. SMITH, OF ST. LOUIS, MISSOURI, ASSIGNORS, BY DIRECT AND MESNE ASSIGNMENTS, OF PART TO C. W. CRUTSINGER, OF SAME PLACE.

AUTOMATIC RELEASE FOR CABLE-GRIPS.

SPECIFICATION forming part of Reissued Letters Patent No. 11,275, dated October 4, 1892.

Original No. 458,432, dated August 25, 1891. Application for reissue filed June 21, 1892. Serial No. 437,546.

*To all whom it may concern:*

Be it known that we, ALBERT D. SMITH and FRANK W. SMITH, of the city of St. Louis, State of Missouri, have invented certain new and useful Improvements in Automatic Releases for Cable-Grips, of which the following is a full, clear, and exact description, reference being had to the accompanying drawings, forming a part thereof.

Our invention relates to improvements in automatic releases for cable-crossings; and it consists in the novel arrangement and combination of parts, as will be more fully hereinafter described, and designated in the claims.

In the drawings, Figure 1 is a side elevation of our complete invention as applied to a cable-grip. Fig. 2 is a horizontal cross-section taken on the line *x x* of Fig. 1. Fig. 3 is a perspective view of the framework which fits over the cable-grip and also the block which depresses the same, the parts broken away. Fig. 4 is a perspective view of a dog which is carried by the grip-lever, and also shows the manner in which the same is disengaged by the mechanism embodied in our invention; and Fig. 5 is a perspective view of a connecting-bar which we employ in connection with the framework, as is clearly illustrated in Fig. 3.

The object of our invention is to construct a device for automatically releasing the grip from the cable at cable-crossings as the car advances.

The device that we employ is adapted to be attached to the ordinary cable-grip without any material change or modification in the same.

Referring to the drawings, 1 indicates a cable-grip of ordinary construction, showing the same properly located in the slot of the framework of the subway and also clamping the cable 2. 3 indicates the cable that crosses cable 2. The grip 1 embodies the ordinary construction, as above stated, and is also functionally operated as ordinary grips and requires no minute description or further elucidation.

Referring to the grip-releasing mechanism, 4 indicates a frame, preferably of the construction as shown in Fig. 3. Said frame has an open end, which is preferably connected by a connecting-bar 5, of the construction as shown in Fig. 5. Said frame 4 is provided with projecting portion 6, for the purpose hereinafter described, and also with eyes or perforations 7, in which the ends of the connecting-bar 5 are adapted to be inserted. Said connecting-bar 5 is provided with a perforation 8, in which an upright piece 9 may be secured, and also with a perforation 10, in which a pin 11 may be inserted for holding said connecting-bar 5 in the frame 4. Frame 4 is also provided with a bearing or perforation 12, in which an upright piece 13 may be secured. Frame 4 is adjustable in a vertical direction on upright pieces 9 and 13. Upright pieces 9 and 13 are secured in any suitable and mechanical manner to a U-shaped bar 14, preferably, however, as shown in the drawings.

15 indicates a bar corresponding in form to the upper portion of the grip, the ends of said bar being secured in any suitable and mechanical manner to the U-shaped bar 14, preferably, however, as shown in the drawings.

16 indicates the grip-lever, which is of the ordinary construction, the same being interposed between bar 15 and the tooth portion 17 of the grip.

18 indicates bands or rings, which hold bar 15 in the desired position, thereby permitting the same to move upwardly and downwardly.

19 indicates a spiral spring, which is secured to grip-lever 16 and to the toothed portion of the grip, the function of which is to pull the grip-lever over to release the cable when the same is disengaged from 17.

In place of using spiral spring 19, as illustrated, we may use a volute spring and mount the same on bolt 20, which secures the grip-lever to the grip, as shown in dotted lines.

Grip-lever 16 carries a dog 21, the same being provided with a lateral projecting portion 22′, which lies normally under bar 15. Of course when bar 15 presses on the said portion the dog will be disengaged and the lever 16 will be drawn over by the agency of spring 19, thereby opening the jaws of the grip and releasing cable 2.

Having described the mechanism by which the dog carried by the grip-lever is disengaged, we will now proceed to describe the means for depressing the said mechanism, which operation effects said disengagement.

22 indicates blocks or wedges, preferably of the construction as shown in Figs. 1 and 3, which are secured in any suitable and mechanical manner to the under side of the framework 23 of the subway adjacent to the slot in which the grip moves. Said blocks or wedges may be made of any desired length and are located, as hereinbefore stated, laterally relative to the crossing cable 3. When the grip moves along, as shown by an arrow in Fig. 1, the projecting portion 6 will strike the under surface of the wedge or wedges 22. The tapering form of said blocks or wedges 22, as illustrated, will necessarily depress the frame 4 and the bar 15, which is actuated by said frame. The bar 15 will press downwardly on the projection 22′, and consequently disengage dog 21.

25 indicates a spiral spring, one end of which is secured to bolt 20 and the opposite end thereof secured to the U-shaped bar 14, the function of which is to restore the framework and its attachments to their normal position after they have been lowered or depressed by the wedges or blocks 22. We may employ one or more blocks at the cable-crossing. It may be observed that framework 4 and the mechanism secured thereto are free to move upwardly and downwardly on the lower portion of grip 1.

To more clearly convey what constitutes the frame designated as frame 4 in the specification, and properly indicate its location with reference to the subway, it may be stated that the frame proper includes the lower projecting portions 6, suitably connected at their ends and embracing the grip, and upright pieces 9 and 13 passing through the slot-rails, and U-shaped bar 14, normally located above the slot-rails and connected to said upright pieces. It is to be noted that only the lower portion of the frame co-operates with the wedges or blocks under the slot-rails for operating the entire frame and simultaneously releasing the pawl carried by the grip-lever.

Having fully described our invention, what we claim is—

1. An automatic release for cable-grips, comprising a frame having a lower portion embracing the grip below the slot-rails, upright pieces at either end of said lower portion, wedges located in the subway, co-operating with said lower portion, and means attached to the upper portion of said rods in operative connection with the pawl carried by the grip-lever for releasing the same, substantially as described.

2. An automatic release for cable-grips, comprising a frame having a lower portion embracing the grip below the slot-rails, a bar forming the upper portion thereof, upright pieces at either end of said bar connecting the lower and upper portions, respectively, wedges located in the subway, co-operating with said lower portion, and means attached to the upper portion of the frame and in operative connection with the pawl carried by the grip-lever for releasing the same, substantially as set forth.

3. An automatic release for cable-grips, comprising a frame 4, a bar 15, actuated by said frame for releasing the pawl carried by the grip-lever, means located in the subway, against which the lower portion of the frame is brought in contact, and a spring for restoring the said frame to its normal position, substantially as described.

4. An automatic release for cable-grips, consisting of a frame the lower portion of which is located in the subway, a bar 15, attached to the upper portion of the frame for releasing the pawl carried by the grip-lever, means for restoring the frame to its normal position, wedges located in the subway, against which the lower portion of the frame is brought in contact, and a spring 19 for throwing the grip-lever in one direction after the same has been released.

5. The herein-described automatic release for cable-crossings, having a vertically-adjustable frame, such as 4, a connecting-bar, such as 5, for connecting the ends of the said frame, upright pieces 9 and 13, secured to the said connecting-bar and frame, respectively, U-shaped bar 14, secured to said upright pieces, a bar 15, secured to the said U-shaped bar and adapted to depress and disengage a dog 21, carried by the grip-lever, a spring 19 for operating said grip-lever, and a wedge or block, such as 22, for depressing or lowering said framework 4, substantially as set forth.

In testimony whereof we affix our signatures in the presence of two witnesses.

ALBERT D. SMITH.
FRANK W. SMITH.

Witnesses:
D. IND. NEUDORF,
WILLIAM J. WALKER.